(12) United States Patent
Leventhal et al.

(10) Patent No.: US 9,336,753 B2
(45) Date of Patent: May 10, 2016

(54) EXECUTING SECONDARY ACTIONS WITH RESPECT TO ONSCREEN OBJECTS

(71) Applicant: AI Squared, Manchester Center, VT (US)

(72) Inventors: Aaron M. Leventhal, Winchester, MA (US); Jeffrey P. Bigham, Rochester, NY (US)

(73) Assignee: AI Squared, Manchester Center, VT (US)

( * ) Notice: Subject to any disclaimer, the term of this patent is extended or adjusted under 35 U.S.C. 154(b) by 179 days.

(21) Appl. No.: 14/017,810

(22) Filed: Sep. 4, 2013

(65) Prior Publication Data
US 2014/0068525 A1 Mar. 6, 2014

Related U.S. Application Data

(60) Provisional application No. 61/697,054, filed on Sep. 5, 2012.

(51) Int. Cl.
*G06F 3/048* (2013.01)
*G09G 5/37* (2006.01)
*G09G 5/373* (2006.01)
*G06F 3/0481* (2013.01)
*G06F 9/44* (2006.01)

(52) U.S. Cl.
CPC .............. *G09G 5/37* (2013.01); *G06F 3/0481* (2013.01); *G06F 3/04812* (2013.01); *G06F 9/4443* (2013.01); *G09G 5/373* (2013.01); *G06F 2203/04805* (2013.01); *G06F 2203/04806* (2013.01)

(58) Field of Classification Search
CPC ...... G06F 3/0481; G06F 3/0482; G06F 3/033
See application file for complete search history.

(56) References Cited

U.S. PATENT DOCUMENTS

| 6,281,879 | B1 | 8/2001 | Graham |
| 7,493,570 | B2 | 2/2009 | Bobbin et al. |
| 2005/0114778 | A1 | 5/2005 | Branson |
| 2006/0143571 | A1 | 6/2006 | Chan |
| 2007/0061732 | A1 | 3/2007 | Bobbin et al. |
| 2007/0136692 | A1 | 6/2007 | Seymour |
| 2009/0172516 | A1 | 7/2009 | Gill |

(Continued)

FOREIGN PATENT DOCUMENTS

CN 101840273 9/2010

OTHER PUBLICATIONS

David Pogue, "Windows 7: The Missing Manual", O'Reilly Media, Inc, XP002718203, Oct. 24, 2010, p. 152.*

(Continued)

*Primary Examiner* — Omar Abdul-Ali
(74) *Attorney, Agent, or Firm* — Wolf, Greenfield & Sacks, P.C.

(57) ABSTRACT

In a computer system receiving input from a user via at least a keyboard and a pointing device, in which input via the pointing device causes corresponding movement of a pointing image on a display screen of the computer system, user input may be received via the pointing device to point the pointing image at an onscreen object on the display screen. In response to the user activating a key on the keyboard while the pointing image is pointing at the onscreen object, a secondary action with respect to the onscreen object may be executed.

27 Claims, 7 Drawing Sheets

(56) References Cited

U.S. PATENT DOCUMENTS

2011/0314376 A1 12/2011 Dearman
2012/0242578 A1 9/2012 Laubach

OTHER PUBLICATIONS

Windows 7 Service Pack 1. Copyright 2009. Microsoft Corporation. Screenshots taken Jun. 29, 2015. Figures 1-7.*
Space Bar as Modifier kills auto-replace after space. http://www.autohotkey.com/board/topic/76050-space-bar-as-modifier-kills-auto-replace-after-space/, retrieved Jun. 9, 2013, 3 pages.
Mapping space as a modifier key. http://us.battle.net/wow/en/forum/topic/2489159919, retrieved Jun. 9, 2013, 2 pages.
Issue with Spacebar as a Modifier Key. http://www.blenderartists.org/forum/showthread.php?287249-Issues-with-Spacebar-as-a-Modifier-Key retrieved Jun. 9, 2013, 2 pages.
Using Spacebar (or any key) to Left-Click (Mouse)—MacRumors Forums. http://forums.macrumors.com/showthread.php?t=1032533, retrieved Jun. 19, 2013, 2 pages.
Invitation to Pay Additional Fees for PCT/US2013/057999, mailed Jan. 8, 2014.
International Search Report and Written Opinion for International Application No. PCT/US2013/057999, mailed Mar. 7, 2014.
Written Opinion for International Application No. PCT/US2013/057999, mailed Aug. 22, 2014.
International Preliminary Report on Patentability for PCT/US2013/057999/mailed Dec. 9, 2014.
"Recorded Problem Steps" XP055154670 (retrieved Nov. 24, 2014) (11 pages).

* cited by examiner ly offers several secondary actions from which the user may select. However, using the secondary selection mechanism can be difficult or impossible for some users, such as users with disabilities that affect fine motor control. For example, pressing the right button of a mouse, which is the secondary selection mechanism on many conventional mice, can require a greater degree of fine motor control than some users can muster. In some cases, pressing the right button of the mouse can result in unintentional movement of the mouse, causing the pointing image (e.g., mouse cursor) to slip off of the desired onscreen object, such that the context menu that appears is for a different onscreen object than the user intended. Similar issues can arise for users with other types of pointing devices, such as touchpads and trackballs, for example.

EXECUTING SECONDARY ACTIONS WITH RESPECT TO ONSCREEN OBJECTS

CROSS-REFERENCE TO RELATED APPLICATIONS

This application claims a priority benefit, under 35 U.S.C. §119(e), to U.S. Provisional Application No. 61/697,054, entitled "Enhanced Accessibility Technologies," filed Sep. 5, 2012, which is incorporated herein by reference in its entirety.

BACKGROUND

In computer systems having visual displays for providing output to a user, many onscreen objects have actions that can be executed with respect to them. For example, a desktop icon can often be double-clicked to launch an application, and a hyperlink can often be single-clicked to navigate to a linked webpage.

As used herein, the term "object" refers to a visual item, represented as data in computer memory, that when rendered visually on a computer display, can be selected by a user (e.g., via a pointing device or other input mechanism). Examples of objects include, but are not limited to, icons, buttons, menus, document headings, sliders, visual containers, graphs, and text. As used herein, the term "visual container" refers to any object that includes (i.e., contains) one or more other objects within it. An example of a visual container is a window. As used herein, the term "onscreen object" refers to any visual rendering of an object on a display.

Many onscreen objects have a primary action associated with the object, as well as a set of one or more secondary actions associated with the object. As used herein, the term "primary action," when used with reference to an onscreen object, refers to an action that occurs when a user selects the onscreen object using the primary selection mechanism of a pointing device, e.g., via left-click (e.g., for a mouse), tap (e.g., for a touchpad), or other primary pointing device selection mechanism. Non-limiting examples of onscreen object primary actions include activating a button, navigating a link, setting the input focus to a textbox, and opening a menu.

As used herein, the term "secondary action" refers to a non-primary action performed in the context of an onscreen object being pointed at using a pointing device. Often there is a set of several secondary actions available for a particular onscreen object. Non-limiting examples of secondary actions include opening the onscreen object in an alternate application or view, renaming the onscreen object, copying the onscreen object to the clipboard, and retrieving spell checker suggestions for the onscreen object.

SUMMARY

One type of embodiment is directed to a method in a computer system receiving input from a user via at least a keyboard and a pointing device, wherein input via the pointing device causes corresponding movement of a pointing image on a display screen of the computer system, the method comprising: receiving user input via the pointing device to point the pointing image at an onscreen object on the display screen; and in response to the user activating a key on the keyboard while the pointing image is pointing at the onscreen object, executing a secondary action with respect to the onscreen object.

Another type of embodiment is directed to at least one computer-readable storage medium storing computer-executable instructions that, when executed, perform a method in a computer system receiving input from a user via at least a keyboard and a pointing device, wherein input via the pointing device causes corresponding movement of a pointing image on a display screen of the computer system, the method comprising: receiving user input via the pointing device to point the pointing image at an onscreen object on the display screen; and in response to the user activating a key on the keyboard while the pointing image is pointing at the onscreen object, executing a secondary action with respect to the onscreen object.

Another type of embodiment is directed to a computer system comprising a display screen configured to provide output from the computer system to a user, a keyboard configured to accept input from the user to the computer system, a pointing device configured to accept input from the user to the computer system, wherein input via the pointing device causes corresponding movement of a pointing image on the display screen, at least one processor, and at least one storage medium storing processor-executable instructions that, when executed by the at least one processor, perform a method comprising: receiving user input via the pointing device to point the pointing image at an onscreen object on the display screen; and in response to the user activating a key on the keyboard while the pointing image is pointing at the onscreen object, executing a secondary action with respect to the onscreen object.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
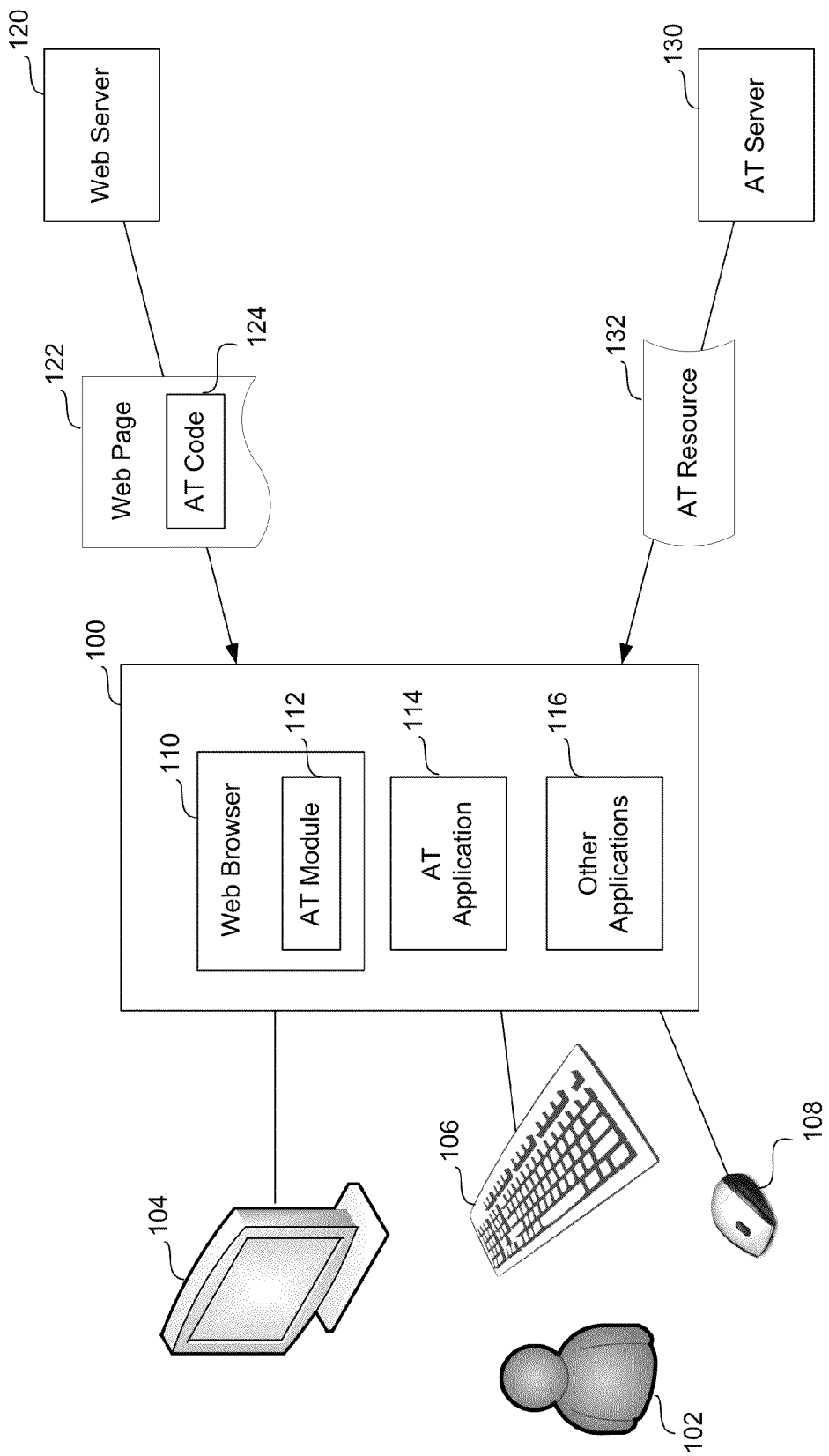
FIG. 1 is a block diagram illustrating an exemplary operating environment for a computer system in accordance with some embodiments of the present invention.

Secondary actions may be useful for allowing onscreen objects to be manipulated using a pointing device, to cause additional actions other than the onscreen object's primary action to be executed. The inventors have recognized, however, that conventional techniques for providing access to secondary actions have disadvantages that may cause difficulties for some users.

For example, one common conventional technique for providing access to secondary actions is to list the available secondary actions in a context menu that appears when the onscreen object is selected using a secondary selection mechanism of the pointing device. The context menu typically is not visible until the user performs the selection using the secondary pointing device mechanism. For example, a context menu for a hyperlink can often be made to appear by right-clicking on the hyperlink using a mouse. That is, the right mouse button operates as a secondary selection mechanism of the pointing device (the mouse), which when pressed while pointing at the hyperlink causes the hyperlink's previously unseen context menu to appear. (By contrast, the left mouse button typically operates as the primary selection mechanism of the mouse, which when pressed while pointing at the hyperlink causes the primary action of the hyperlink to be executed.) Typical options for secondary actions that might be listed in the context menu that appears when a hyperlink is right-clicked might include: "Open Link in New Window," "Open Link in New Tab," "Bookmark This Link," "Save Link As," etc. A particular secondary action can then be selected by pointing the mouse pointer at the desired secondary action listed in the context menu and activating the mouse's primary selection mechanism (e.g., the left click button).

The inventors have recognized, however, that secondary actions provided in a context menu require additional time, cognitive processing, care and coordination to be successfully accessed by a user, and may be difficult for some users to use. Many users do not realize that context menus are available, since the typical context menu is not visible until the onscreen object is right-clicked. Moreover, the set of secondary actions listed in a context menu typically differs for different onscreen objects, and it may not occur to a user who is unaware of the availability of a particular secondary action to right-click on the onscreen object to explore what secondary actions are available. In addition, context menus may be particularly difficult for visually impaired users to use, since context menus require visual inspection to determine which secondary actions are available, to locate the desired secondary action in the context menu list, and to point at and successfully select it.

Another example of a conventional technique for providing access to secondary actions is progressive disclosure of secondary contextual options. In this technique, when the user clicks, touches, or hovers on an onscreen object, secondary options appear as additional user interface elements that themselves may contain further secondary options. For example, when a user clicks or hovers on a menu item, a submenu of secondary options may appear; and when the user clicks or hovers on an item in the submenu, a further submenu of selectable options may appear. Similarly to the context menus discussed above, the inventors have recognized that progressive disclosure of secondary options requires additional time, cognitive processing, care and coordination for successful use, and may be difficult for some users, particularly since multiple selections and visual exploration are required to identify the available options.

Another example of a conventional technique for providing access to secondary actions is to provide a toolbar button that temporarily changes what action will be executed on the next mouse click. For example, a screen reader toolbar might provide a button that, when activated, causes the next onscreen object that is clicked to be spoken aloud instead of executing the onscreen object's primary action. In essence, activating the toolbar button changes the "mode" of the next mouse click. The inventors have recognized that this technique may lead to confusion because some users may be likely to forget what mode is currently activated and may execute unintended actions, and additional work may be required of the user to set or clear the mode.

Another example of a conventional technique for providing access to secondary actions is to execute a secondary action when the user activates a selection mechanism on the pointing device while concurrently holding down a modifier key on the keyboard. A modifier key is a keyboard key such as "Shift," "Alt," "Ctrl," or "Meta," that temporarily modifies the normal action of another key (or a pointing device) when held down, but usually does nothing when pressed by itself. It should be appreciated that when a modifier key is used to cause a pointing device activation to execute a secondary action, the execution of the secondary action is performed in response to the pointing device activation (e.g., in response to the mouse click), not in response to the activation of the modifier key. Typically, the modifier key is held down before and during the mouse click, and has the effect of modifying what action is executed in response to the mouse click. The inventors have recognized that secondary actions provided by the use of modifier keys in conjunction with the pointing device tend not to be easily discoverable, and many users do not become aware of their availability. This may be particularly so since the available secondary actions using the same modifier key may be different for different onscreen objects, and may have no memorable connection to the label ("Shift," "Alt," "Ctrl," etc.) on the modifier key. Furthermore, the inventors have recognized that it may be physically challenging for some users to press physical controls on two separate input devices (e.g., a keyboard key and a mouse button) at once.

Other examples of prior techniques for providing access to secondary actions involve the use of additional physical buttons, wheels, or other input mechanisms attached to a pointing device; alternative input mechanisms such as speech or camera input in conjunction with the pointing device; or particular touch-based gestures (such as pinching) on a gesture-capable touch input device (such as a gesture-capable mouse touchpad or touchscreen). The inventors have recognized that each of these techniques requires additional and often non-standard hardware that may not be available to some users.

Yet another example of a conventional technique for providing access to secondary actions is to assign a particular secondary action to be executed when the pointing device is used to "drag" a particular onscreen object to another particular onscreen object. An example of this technique is dragging on onscreen object to the trashcan icon to delete data associated with the onscreen object. The inventors have recognized that such secondary actions may not be easily discoverable, since each secondary action available through this technique would require knowledge of the specific pair of onscreen objects that must be put in contact to cause the secondary action to be executed. Also, moving a pointing device while holding down a physical button on the pointing device may be difficult for some users, especially if the onscreen object being dragged is far away on the display screen from the onscreen object to which it is being dragged.

In some cases, it may be desirable to provide additional secondary actions that are not available from the originating software that provides the onscreen object to the display. For example, one environment in which additional secondary actions may be desirable is in the context of Accessibility Technology (AT) software, which facilitates the use of computers by users with disabilities or age-related ability issues, such as visual impairment. AT software may apply visual enhancements, such as magnification, highlighting, color enhancements, and/or other enhancements to onscreen objects, and/or may provide screen reading functions, and/or any other suitable functions to enhance accessibility of computer content. In many cases, AT software operates as an external software layer to the software that originates the content being enhanced. For example, the originating software in a user's computer system that generates a button in a web page as an onscreen object for display may be a web browser application, which may generate the onscreen object in accordance with instructions encoded in the web page downloaded to the user's computer system from a web server. In some arrangements, AT software distinct from the originating software's own functionality may operate to provide one or more additional secondary actions for the onscreen object generated by the originating software, such as magnification and/or speech output.

The inventors have recognized that many conventional techniques for providing access to secondary actions suffer from additional drawbacks in the context of secondary actions provided by external software layers such as AT software. For example, the context menu displayed when a hyperlink or other onscreen object in a webpage is right-clicked is often controlled by the web browser, and many web browsers do not provide the ability for an external software layer to insert additional secondary action options into the context menu. Moreover, many users may be unlikely to look for externally supplied secondary action options in the context menu normally provided by the web browser. In many cases, some conventional techniques for providing access to secondary actions may be unavailable to an external software layer because of conflicting usage by the originating software. For example, the web browser may already have mapped some or all of the available modifier keys, pointing device selection mechanisms, touch gestures, etc., to particular primary or secondary actions for an onscreen object, such that an external software layer such as an AT utility is unable to map the same input mechanisms to different secondary actions such as magnification, speech output, etc., without causing a conflict. The inventors have appreciated that when one or more conventional input mechanisms are already mapped to conflicting secondary actions, the remaining conventional input mechanisms available for use by the external software layer may be less desirable because they are less intuitive or accessible to the user. For example, when basic touch gestures are already assigned, the remaining available touch gestures may be more complex to perform and therefore undesirable, especially for facilitating use by an impaired user.

The inventors have recognized that advantages over the foregoing conventional techniques may be realized through novel techniques of executing secondary actions with respect to onscreen objects in response to activation of a keyboard key, as opposed to executing secondary actions in response to activation of a pointing device selection mechanism (e.g., a mouse button click) or specialized hardware. Keyboards are ubiquitous and frequently used in computing, and the inventors have appreciated that the larger and/or more commonly used a key is, the easier it may be for users (especially impaired users) to press and operate.

Accordingly, some embodiments described herein relate to techniques for utilizing keyboard keys in executing secondary actions with respect to onscreen objects, which techniques may address one or more of the above-discussed shortcomings of traditional methods, and/or may provide one or more of the foregoing benefits. However, aspects of the invention are not limited to any of these benefits, and it should be appreciated that some embodiments may not provide any of the above-discussed benefits and/or may not address any of the above-discussed deficiencies that the inventors have recognized in conventional techniques.

In some embodiments, a user may use a pointing device to point at an onscreen object, and may press or otherwise activate a keyboard key to cause a secondary action associated with the onscreen object to be executed. In some embodiments, the secondary action may be assigned to a large and/or commonly used keyboard key, for ease of accessibility. For example, the inventors have appreciated that the spacebar, in particular, may be an ideal key for many users, as it is relatively large, familiar for most users, and tends to be in the same or similar position across different devices and keyboards for different languages. However, some embodiments are not limited to use of the spacebar, and any suitable keyboard key(s) may be used.

In some embodiments, the keyboard key used to cause execution of a secondary action with respect to an onscreen object may have a primary action associated with the keyboard key itself, different from any secondary actions associated with the onscreen object. For example, the primary action of text input keys (such as letter keys and the spacebar) is typically to cause modification of or navigation through text when pressed. Generally, a keyboard key having an associated primary action can cause execution of the primary action when the key is pressed by itself. Such keys differ from modifier keys (e.g., "Shift," "Alt," "Ctrl," etc.), as the actions caused by modifier keys are typically not specified except in the context of another concurrent input such as a press of another keyboard key or an activation of a pointing device input mechanism (e.g., a mouse click). However, some embodiments are not limited to the use of keys such as text input keys having associated primary actions, and any suitable key(s), including modifier keys, may be used in some embodiments.

In some embodiments, activation of a keyboard key may cause different actions to be executed, depending on whether or not an onscreen object is concurrently targeted via a pointing device. For example, in some embodiments, a keyboard key's primary action may be executed when the key is activated while no onscreen object is concurrently targeted via a pointing device. When an onscreen object is concurrently targeted via the pointing device, a secondary action associated with the onscreen object, different from the primary action associated with the keyboard key, may be executed instead. For instance, in one specific example in accordance with some embodiments, a space may be inserted in text when the spacebar is activated while no onscreen object is targeted via the pointing device, but instead an onscreen object may be magnified when the spacebar is activated while that onscreen object is targeted via the pointing device. Thus, in some embodiments, to determine whether to execute a secondary action with respect to an onscreen object in response to activation of a keyboard key, a determination may first be made as to whether the onscreen object is targeted via the pointing device when the key is activated. Exemplary techniques for making such a determination are described below.

In some embodiments, different keyboard keys may be assigned to cause execution of different secondary actions with respect to the same onscreen object(s). For example, in some embodiments, for a given onscreen object targeted via the pointing device, pressing different designated keyboard keys may cause execution of different secondary actions from a set of secondary actions available for the targeted onscreen object. In some embodiments, keyboard keys may be assigned based at least in part on intuitive connections between particular keys and particular secondary actions. In one non-limiting example, the letter key "T" may pressed to translate a targeted onscreen object (e.g., intuitive because "translate" begins with the letter "T"), and/or the spacebar may be pressed to magnify a targeted onscreen object (e.g., intuitive because the spacebar is larger than other keys, and magnification enlarges an onscreen object). However, intuitive mappings between particular secondary actions and particular keyboard keys are not required, as aspects of the invention are not limited in this respect.

It should be appreciated that the foregoing description is by way of example only, and aspects of the invention are not limited to providing any or all of the above-described functionality, although some embodiments may provide some or all of the functionality described herein.

The aspects of the present invention described herein can be implemented in any of numerous ways, and are not limited to any particular implementation techniques. Thus, while examples of specific implementation techniques are described below, it should be appreciated that the examples are provided merely for purposes of illustration, and that other implementations are possible.

One illustrative application for the techniques described herein is for use in a computer system 100 operated by a (human) user 102. An exemplary operating environment for such a system is illustrated in FIG. 1. Computer system 100 may be implemented in any suitable form, as aspects of the invention are not limited in this respect. For example, computer system 100 may be implemented as a single stand-alone machine, or may be implemented by multiple distributed machines that share processing tasks in any suitable manner. Computer system 100 may be implemented as one or more computers; an example of a suitable computer is described below. In some embodiments, computer system 100 may include one or more tangible, non-transitory processor-readable storage devices storing processor-executable instructions, and one or more processors that execute the processor-executable instructions to perform the functions described herein. The storage devices may be implemented as computer-readable storage media (i.e., tangible, non-transitory computer-readable media) encoded with the processor-executable instructions; examples of suitable computer-readable storage media are discussed below.

Exemplary computer system 100 receives input from user 102 via at least a keyboard 106 and a pointing device 108, and provides output to user 102 via at least a display screen 104. Any suitable types of display screen, keyboard, and pointing device may be used, as aspects of the invention are not limited in this respect. Display screen 104 may be any type of display component capable of presenting onscreen objects visually to user 102, and need not be two-dimensional.

Keyboard 106 may be any type of manual input component providing at least textual input functionality capable of registering input concurrently with and independent of pointing device input. In some embodiments, keyboard 106 may be a physical hardware component having physical keys that can be individually pressed by user 102; however, this is not required. In other embodiments, keyboard 106 may be a virtual construct such as a graphical keyboard displayed on a touchscreen. As used herein, the terms "keyboard key" and "key" encompass both physical keys and virtual keys that can be manually pressed (e.g., by a finger, a stylus, or other object capable of delivering a push) to register keyboard input. The plurality of keyboard keys provided by keyboard 106 to accept at least textual input need not all be contained in the same physical device, but in some embodiments may be divided and/or separated in any suitable way, such as into a left-hand keyboard, right-hand keyboard, separated number pad, etc.

Pointing device 108 may be any suitable device capable of accepting user input to cause corresponding movement of a pointing image on display screen 104. Non-limiting examples of pointing devices include a mouse, a trackball, a joystick, a pointing stick, a touchpad, a stylus, an eye-tracking device, and a finger (e.g., used in conjunction with a touchscreen to position a pointing image). As used herein, the term "pointing image" refers to a graphical image (such as a mouse pointer) displayed on display screen 104 in a moveable position determined by user input received via pointing device 108. A "pointing image," as used herein, is different from a "caret" or an "insertion point." Both "caret" and "insertion point," as used herein, refer to a visual indicator of the position at which textual input will be registered. While some embodiments may be limited to the use of a pointing device having a corresponding pointing image on a display screen, other embodiments may not be so limited. In other embodiments, one or more input mechanisms without corresponding pointing images may be employed to allow the user to point at and/or target an onscreen object, such that activation of a keyboard key will cause execution of a secondary action with respect to the onscreen object pointed at (by something other than a pointing image) and/or otherwise targeted.

Display screen 104, keyboard 106, and pointing device 108 need not be separate physical devices, but in some embodiments may be integrated in any suitable combination, such as in a touchscreen-type apparatus that combines display screen, keyboard, and/or pointing device functionality. In addition, while a single display screen, keyboard, and pointing device are referred to herein for simplicity, some embodiments may make use of multiple display screens, keyboards, and/or pointing devices to provide equivalent and/or similar functionality.

In the example depicted in FIG. 1, exemplary computer system 100 includes various output-producing components, such as web browser 110, AT application 114, and other applications 116. Each of these processing components of system 100 may be implemented in software, hardware, or a combination of software and hardware. Components implemented in software may comprise sets of processor-executable instructions that may be executed by the one or more processors of computer system 100 to perform the functionality described herein. Each of web browser 110, AT application 114, and other applications 116 may be implemented as a separate component of computer system 100 (e.g., implemented by hardware and/or software code that is independent and performs dedicated functions of the component), or any combination of these components may be integrated into a single component or a set of distributed components (e.g., hardware and/or software code that performs two or more of the functions described herein may be integrated, the performance of shared code may be distributed among two or more hardware modules, etc.). In addition, any one of web browser 110, AT application 114, and other applications 116 may be implemented as a set of multiple software and/or hardware components. Although the example operating environment of FIG. 1 depicts web browser 110, AT application 114, and other applications 116 implemented together on computer system 100, this is only an example; in other examples, any or all of the components may be implemented on one or more separate machines, or parts of any or all of the components may be implemented across multiple machines in a distributed fashion and/or in various combinations. It should be understood that any such component depicted in FIG. 1 is not limited to any particular software and/or hardware implementation and/or configuration.

While web browser 110 and AT application 114 are provided as examples of applications that may be run on computer system 100, it should be appreciated that aspects of the invention are not limited to the inclusion of either or both of web browser 110 and AT application 114. Furthermore, while AT application 114 is provided as a particular example of a component of computer system 100 (e.g., a software application) that may provide functionality described herein (e.g., to execute secondary actions with respect to onscreen objects), it should be appreciated that aspects of the invention are not limited to being performed by an AT application. In particular, while providing secondary actions designed to improve accessibility may be one beneficial exemplary use of the techniques described herein, some embodiments are not limited to accessibility technology, and the techniques described herein may be applied to any suitable type(s) of secondary actions provided by any suitable type(s) of application and/or component.

In some embodiments, AT application 114 may be configured to operate (e.g., via execution of a set of instructions by the one or more processors of computer system 100) to provide and/or cause execution of secondary actions with respect to onscreen objects that are generated for display on display screen 104 by AT application 114 itself and/or by other components such as web browser 110 and/or other applications 116 (including, for example, the operating system of computer system 100). In some embodiments, AT application 114 may make available one or more secondary actions for an onscreen object generated by another component such as web browser 110 or another application 116, where the secondary action(s) provided by AT application 114 were not included in any set of secondary actions provided by the component that generated the onscreen object. For instance, in one particular example, web browser 110 may provide an image for display on display screen 104 with a set of available secondary actions such as "Save Image" and "Copy Image," and AT application 114 may provide one or more additional secondary actions such as "Magnify Image." In other embodiments, AT application 114 (or a non-AT component configured to provide functionality described herein) may enable execution of secondary actions provided by another component such as web browser 110 or another application 116 using techniques described herein (e.g., in response to activation of a keyboard key), whether or not AT application 114 provides any of its own secondary actions in addition to those provided by the other component.

It should be appreciated that in embodiments in which the functionality described herein is provided by AT application 114 (or a non-AT component configured to provide functionality described herein) running on computer system 100, the functionality may be performed with respect to onscreen objects generated by any suitable component(s) of computer system 100 (including onscreen objects generated by AT application 114 itself), and computer system 100 need not include any particular other components such as web browser 110. In embodiments in which a web browser 110 is included in computer system 100, web browser 110 may be configured (e.g., programmed) to provide access to web pages by downloading a web page 122 from a web server 120, executing the code of web page 122 to render web page 122 visually, and displaying the rendered web page 122 on display screen 104.

In some embodiments, as discussed above, secondary actions with respect to onscreen objects generated by web browser 110, either as part of a rendered web page or as part of the browser tool itself (e.g., browser menu items, buttons on a browser toolbar, etc.), may be provided and/or caused to be executed by AT application 114 (or a non-AT component of computer system 100 configured to provide functionality described herein). Alternatively or additionally, in some embodiments web browser 110 may have its own AT module 112 (e.g., a set of instructions) configured to cause web browser 110 to operate (e.g., via execution of the instructions by the one or more processors of computer system 100) to execute secondary actions in any of the manners described herein (e.g., in response to activation of a keyboard key). While AT module 112 is provided as one particular example of a suitable component for providing functionality described herein, it should be appreciated that some embodiments are not limited to accessibility applications, and a similar non-AT module could also be used.

Alternatively or additionally, in some embodiments secondary actions with respect to onscreen objects within web page 122 may be provided and/or caused to be executed by AT code 124 (e.g., one or more instructions) embedded within web page 122 itself. In some embodiments, when web browser 110 executes the code of web page 122, including AT code 124, to render web page 122 for display on display screen 104, the execution of AT code 124 may cause web browser 110 to execute any secondary actions (or certain particular secondary actions) with respect to onscreen objects (or certain particular onscreen objects) within the rendered web page in accordance with techniques described herein (e.g., in response to activation of a keyboard key). While AT code 124 is provided as one particular example of a suitable delivery mechanism for the functionality described herein, it should be appreciated that some embodiments are not limited to accessibility applications, and similar non-AT code could also be used.

In some embodiments, providing and/or executing secondary actions with respect to onscreen objects generated by any component of computer system 100 may involve downloading an AT resource 132 to computer system 100 from an AT server 130. For example, in some embodiments, AT application 114 and/or web browser 110 (e.g., as directed by instructions contained in AT module 112 and/or AT code 124) may query AT server 130 for secondary actions to be provided for certain onscreen objects, for certain web pages, etc., and/or for instructions as to how to execute particular secondary actions (e.g., as to execution in response to activation of particular keyboard keys). Thus, for example, AT resource 132 may comprise an indication of one or more secondary actions to provide, an indication of one or more mappings to keyboard keys to implement, a script (e.g., a set of instructions) to execute, and/or any other suitable resource to enable functionality described herein. While AT server 130 and AT resource 132 are provided as particular examples for a suitable delivery mechanism for functionality described herein, it should be appreciated that some embodiments are not limited to accessibility applications, and similar non-AT resources could be used.

It should be appreciated from the foregoing that not all components illustrated in FIG. 1 are necessary to include in the same system to enable the functionality described herein. For example, functionality described herein could be implemented in a computer system having AT application 114 alone and/or in conjunction with AT resource 132; a computer system having web browser 110 in conjunction with AT module 112, AT application 114, and/or AT code 124 embedded in web page 122, with or without the use of AT resource 132; or a computer system having any combination of the above. It should be appreciated that the description with respect to FIG. 1 is merely exemplary, and aspects of the invention are not limited to any particular software configuration or delivery mechanism for the techniques described herein.

Figure 2:
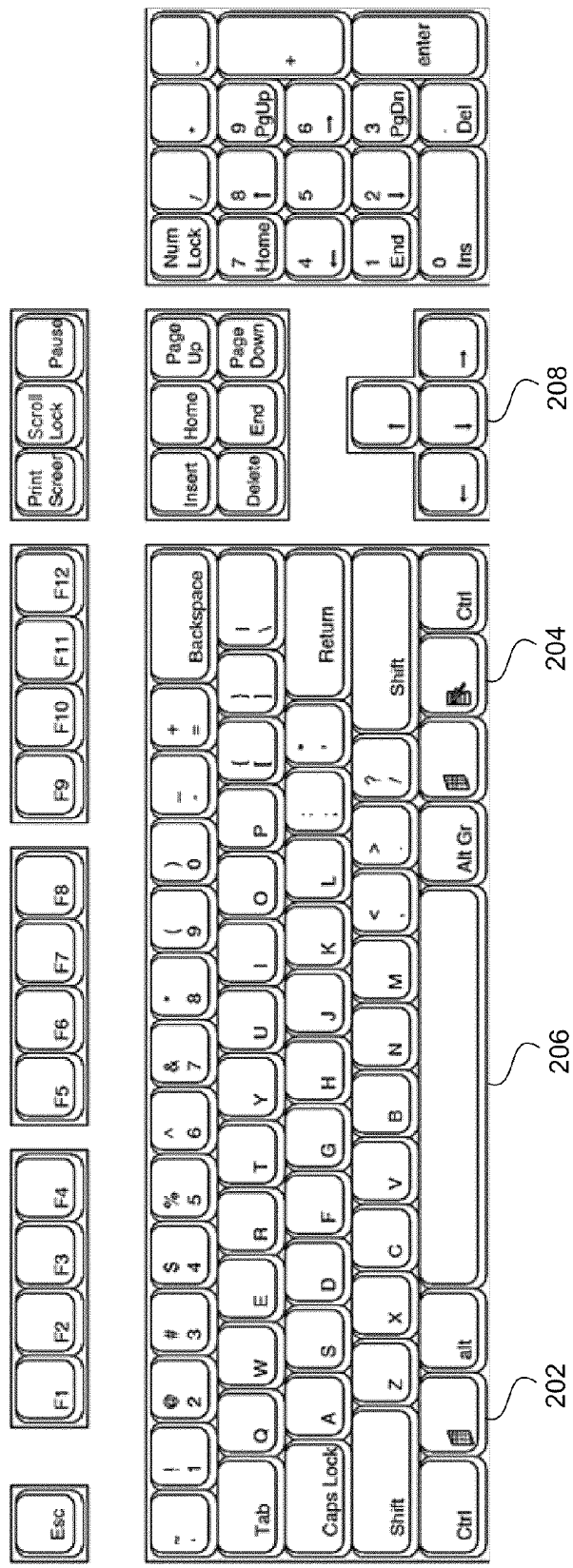
FIG. 2 illustrates an exemplary keyboard layout that may be used with some embodiments of the present invention.

Shown in FIG. 2 is a diagram of an exemplary keyboard layout, for illustration of various types of keyboard keys referred to herein. As used herein, the following types of keyboard keys have the below-described typical functionality when pressed, and encompass the example keys listed below:

Modifier keys typically temporarily modify the normal action of another key when held down, but usually do nothing when pressed by themselves. Examples shown in FIG. 2: Shift, Ctrl, alt, Alt Gr, Windows key 202.

Function keys typically cause execution of different primary actions in the context of different programs running on the computer system. Examples shown in FIG. 2: F1, F2, F3, F4, F5, F6, F7, F8, F9, F10, F11, F12.

Lock keys typically lock other keyboard keys into certain modes of operation. The number lock, when activated, typically causes the number keys on the numeric keypad to type numbers rather than causing navigational movement. The capital lock, when activated, typically causes the letter keys to type uppercase letters instead of lowercase letters. The scrolling lock, when activated, typically causes the arrow keys to scroll a document rather than moving the insertion point. Examples shown in FIG. 2: Scroll Lock, Caps Lock, Num Lock.

System command keys typically cause actions by the operating system, but may also have other primary actions in the context of particular applications. Examples shown in FIG. 2: Esc, Print Screen, Pause, Menu key 204.

Text input keys typically cause modification of or navigation through text. Examples shown in FIG. 2 include keys in the following sub-categories of text input keys: letter keys, number keys, punctuation keys, symbol keys, spacebar and tab keys, navigation keys, and text editing keys.

Letter keys typically enter alphabetic letters into text. In keyboards designed for use in languages with a non-alphabetic writing system, keys in this category may alternatively represent characters or other main textual input. Examples shown in FIG. 2: A, B, C, D, E, F, G, H, I, J, K, L, M, N, O, P, Q, R, S, T, U, V, W, X, Y, Z.

Number keys typically enter numerals into text. Examples shown in FIG. 2: 1, 2, 3, 4, 5, 6, 7, 8, 9, 0.

Punctuation keys typically enter punctuation marks into text. Examples shown in FIG. 2: ', ~, !, (, ), -, {, [,},], :, ;, ", ', <, „, >, ., ?, /.

Symbol keys typically enter symbols into text. Examples shown in FIG. 2: @, #, $, %, ^, &, *, _, +, =, |, †.

The spacebar key 206 typically enters a single letter-width space into text. The Tab key typically enters a variable-width space into text, sufficient to bring the insertion point to the next tab stop.

Navigation keys typically move the insertion point within text without modifying the text. Examples shown in FIG. 2: Home, End, Page Up, Page Down, Arrow keys 208.

Text editing keys typically cause text to be removed, either upon the key being pressed (Backspace, Delete), or by setting a mode in which the next text that is typed will overwrite the text following the insertion point (Insert). Examples shown in FIG. 2: Backspace, Delete, Insert.

It should be appreciated that the keyboard layout shown in FIG. 2 is merely exemplary for purposes of illustration, and that aspects of the invention are not limited to any particular keyboard layout. Other keyboard layouts may be used, and may not contain all the types of keyboard keys or example keys listed above, and/or may contain other types of keyboard keys or examples of keys of particular types that are not listed above.

Figure 3:
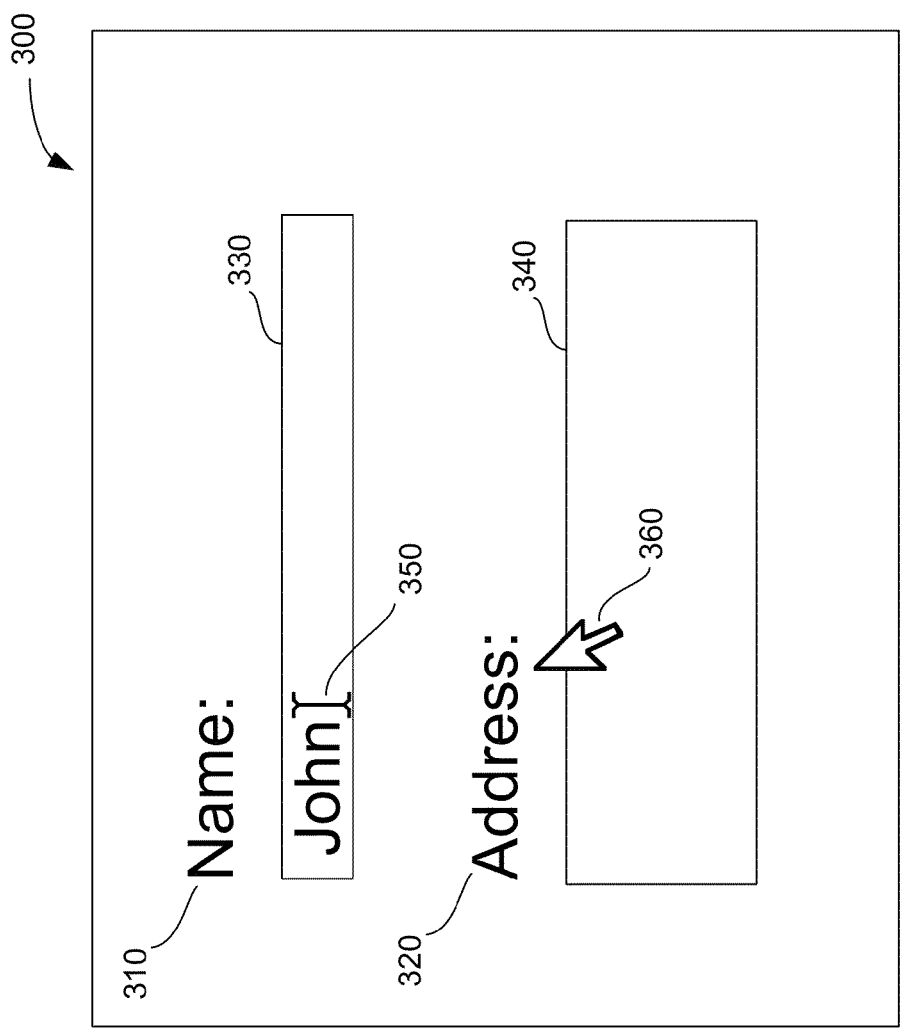
FIG. 3 illustrates an exemplary display to demonstrate aspects of some embodiments of the present invention.

In some embodiments, as discussed above, one or more secondary actions may be provided with respect to an onscreen object. For illustration, FIG. 3 shows an exemplary display screen 300 displaying four onscreen objects: display text fields 310 ("Name:") and 320 ("Address:"), and input text fields 330 and 340. These onscreen objects might represent, for example, portions of an address form included in a web page for the user to transmit address information to the web server. However, as discussed above, aspects of the invention are not limited to the context of web pages, and the functionality described herein may in some embodiments be provided with respect to onscreen objects generated by computer system components other than a web browser (such as, for example, onscreen objects provided to the display screen by the operating system).

On the exemplary display screen 300 of FIG. 3, the text "John" has been typed into input text field 330, and insertion point 350 is positioned after the "n" to indicate that the primary action of the next activation of a text input key will take effect at that position. Pointing image 360 (in this example, a mouse pointer) is located where it was last moved by user operation of the pointing device, and indicates the location at which the activation of a pointing device selection mechanism (in this case, a mouse click) will have an effect, if any. On example display screen 300, pointing image 360 is currently pointing at display text field 320 ("Address:"). As used herein, a pointing image is "pointing at" an onscreen object if activation of the pointing device's primary selection mechanism with the pointing image in its current location would cause execution of the primary action associated with the onscreen object, or if performance of a conventional method for providing access to a secondary action using a pointing device would provide access to a secondary action associated with the onscreen object with the pointing image in its current location. A pointing image is also "pointing at" an onscreen object if the onscreen object has no primary or secondary actions to be executed via activation of a pointing device selection mechanism, but the onscreen object includes one or more pixels directly under the pointing image (i.e., one or more pixels overlapped by pointing image pixels on the display screen).

In some embodiments, the user may point the pointing image at an onscreen object using the pointing device, and then may activate a keyboard key to cause execution of a secondary action with respect to the onscreen object. In the example of FIG. 3, with pointing image 360 pointing to display text field 320, the user may activate a key on the keyboard. In response to the user activating the keyboard key, the computer system (e.g., via execution of instructions by one or more processors) may execute a secondary action with respect to display text field 320. For example, execution of the secondary action may involve magnifying display text field 320, reading display text field 320 aloud as speech output, and/or any other suitable secondary action.

In some instances, a pointing image may be pointing at more than one onscreen object at the same time. This may occur, for example, when a larger onscreen object contains a smaller onscreen object within it. In such a case, when the pointing image is pointing at the smaller onscreen object, it may also be pointing at the larger onscreen object that contains it. Consider, for example, a sidebar that contains a list, which contains a number of list items, each of which contains a hyperlink. When the pointing image is pointing at one of the hyperlinks, it may also be pointing at the list item that contains the hyperlink, the list that contains the list item, and the sidebar that contains the list. In some embodiments, when a keyboard key is activated while the pointing image is pointing at more than one onscreen object, one or more secondary actions with respect to any suitable one or more of the pointed-at onscreen objects may be executed.

In some embodiments, a particular keyboard key may be designated to cause execution of a particular secondary action. In some embodiments, any type of keyboard key may be designated, including any of the exemplary types of keyboard keys described above. However, in other embodiments, designated keyboard keys may be limited to a certain type or types of keyboard key. For example, some embodiments may utilize only keys other than modifier keys; other embodiments may utilize only text input keys, and/or only function keys. These are merely provided as examples, however; any suitable limitation with respect to appropriate keyboard key types may be implemented. In some embodiments, instead of mapping a particular keyboard key to a particular secondary action, the secondary action may be mapped to a particular type of keyboard key or to any suitable subset of the available keyboard keys, such that activation of any keyboard key of that type or belonging to that subset could cause execution of the same secondary action. In some embodiments, the same keyboard key or set of keyboard keys may be designated for executing the same secondary action for all onscreen objects. In other embodiments, however, the same secondary action may be triggered by different keyboard keys with respect to different onscreen objects, and/or the same keyboard key may trigger different secondary actions with respect to different onscreen objects. In some embodiments, the same keyboard key may trigger different secondary actions with respect to onscreen objects generated by different applications. In some embodiments, one or more keyboard keys may be mapped to the same secondary action across onscreen objects and/or applications, while one or more other keyboard keys may have variable mappings. The foregoing are merely examples, however, aspects of the invention are not limited to any particular way of mapping keyboard keys to secondary actions.

In some embodiments, in response to activation of a keyboard key designated to cause execution of a secondary action with respect to an onscreen object, the secondary action may be executed if the onscreen object is pointed at when the key is activated. However, in some cases, before executing the secondary action, a determination may be made as to whether the onscreen object at which the pointing image is pointing is actually being targeted via the pointing device. For example, in FIG. 3, pointing image 360 is pointing at display text field 320, but the display of insertion point 350 indicates that input text field 330 has the current keyboard input focus. If, for example, a text input key such as the spacebar is the keyboard key mapped to the secondary action of magnifying display text field 320, then it may be desirable to disambiguate the user's intent if the user activates the spacebar in the situation depicted in FIG. 3. If the user is targeting display text field 320 via the pointing device when the user activates the spacebar, then the proper response may be to magnify display text field 320. However, if display text field 320 is not targeted via the pointing device when the user activates the spacebar, then the proper response may be to insert a space at the location of insertion point 350 in input text field 330. It should be understood that while an onscreen object must be pointed at in order to be targeted via the pointing device, an onscreen object is not necessarily targeted just because it is pointed at. For example, the user may move the pointing image so that it happens to point at the onscreen object, without intending to target the onscreen object (e.g., because of an accidental movement, or because of a purposeful movement intended to move the pointing image in a particular direction but not intended to target the onscreen object). In another example, the user may have previously targeted the onscreen object via the pointing device, but may have moved on to do something else (such as type in text) without changing the location of the pointing image, which is still pointing at the onscreen object but is no longer targeting it.

Any suitable technique(s) for determining whether an onscreen object is targeted via the pointing device may be utilized, as aspects of the invention are not limited in this respect. In some embodiments, user input via the pointing device and/or the keyboard (and/or any other suitable form of user input) may be analyzed to make the determination. One non-limiting example of a methodology for determining whether an onscreen object is targeted via the pointing device is provided below.

In this example, the determination of whether or not an onscreen object is targeted via the pointing device is expressed as a decision between one of two input modes: "pointer mode" and "focus mode." In pointer mode, it has been determined that the onscreen object currently being pointed at (if any) is targeted via the pointing device, and activation of any key assigned to a secondary action for the pointed-at onscreen object will cause execution of that secondary action. In focus mode, it has been determined that any onscreen object being pointed at is not targeted via the pointing device, and activation of any key having a primary action appropriate for the object that currently has keyboard focus will cause execution of that primary action of the keyboard key. (Optionally, however, a confidence level may be used, as discussed below, to cause some keyboard keys activated in focus mode to be interpreted in pointer mode, even when those keys have appropriate primary actions in focus mode.) For instance, in the example given above with reference to FIG. 3, if the spacebar is pressed while the input mode is pointer mode, display text field 320 may be magnified. If the spacebar is pressed while the input mode is focus mode, a space may be inserted at the location of insertion point 350 in input text field 330.

In the example methodology for determining whether or not an onscreen object is targeted via the pointing device, the input mode begins in pointer mode when user input is received via the pointing device to move the pointing image in any way. When the pointing device is used to set the keyboard focus on an object (e.g., by selecting the object using the pointing device's primary selection mechanism), the input mode is switched to focus mode. From there, if the pointing device is used to move the pointing image outside the bounds of the onscreen object having keyboard focus in a targeting movement, or if the pointing device is used to scroll a document, the input mode is switched back to pointer mode. While in any input mode, if there has been no significant movement via the pointing device since the most recent activation of a keyboard key, or if the only movement via the pointing device has not been a targeting movement, then no change is made to the current input mode.

Any suitable technique(s) for determining whether a movement via the pointing device is a targeting movement may be utilized, as aspects of the invention are not limited in this respect. In one non-limiting exemplary methodology, user input via the pointing device to move the pointing image may be measured, tracking the length of time, path, and rate of acceleration and deceleration of each movement. Various aspects of the measured data may then be weighed against each other to determine whether the movement is more likely targeting or non-targeting. For example, if the movement is performed in a relatively short time (e.g., less than 300 ms), the movement may be less likely to be targeting, while a longer movement may be more likely to be targeting. If the movement accelerates and decelerates evenly without bumps in the acceleration data, the movement may be less likely to be targeting, while uneven acceleration/deceleration may be more indicative of a targeting movement. If the deceleration occurs quickly, the movement may be less likely to be targeting, while slow deceleration may be more indicative of a targeting movement. In this example, the movement data may be reset whenever a button or keyboard key is pressed, or when a threshold period of time (e.g., 2 seconds) elapses with no movement via the pointing device.

In the example methodology for determining whether or not an onscreen object is targeted via the pointing device, when a keyboard key that is not assigned to any secondary action with respect to the onscreen object currently being pointed at is activated in pointer mode, or when a keyboard key is activated while no onscreen object is being pointed at, the input mode may be switched to focus mode before processing the keystroke. When a keyboard key having no primary action with respect to the onscreen object having keyboard focus is activated in focus mode, the input mode may be switched to pointer mode before processing the keystroke. Optionally, when a keyboard key is used in an unlikely manner in focus mode (e.g., the spacebar being pressed at the beginning of an input text field), and/or when the confidence level in focus mode is low, the input mode may be switched to pointer mode before processing the keystroke. Any suitable technique(s) for determining one or more confidence levels in an input mode may be utilized; an exemplary technique is described further below.

As discussed above, it should be appreciated that the foregoing is merely one example provided for illustrative purposes, and aspects of the invention are not limited to any of the foregoing techniques for determining whether an onscreen object is targeted via the pointing device. Yet another example of a suitable technique for determining whether an onscreen object is targeted via the pointing device may be to analyze the current input focus when a keyboard key is activated. For example, if an HTML document has input focus when a key is activated, the input mode may be treated as pointer mode. However, if an element within the document, such as a form control, has input focus when the key is activated, and the key event is consumed by that element, then the input mode may be treated as focus mode. If the key event reaches the document level, the input mode may be treated as pointer mode. Again, this is merely another example, and aspects of the invention are not limited to any particular technique for determining the input mode.

In some embodiments, when a keyboard key is activated while an onscreen object has been determined to be targeted via the pointing device (e.g., in pointer mode), the secondary action assigned to the activated keyboard key with respect to the onscreen object may be executed. In some embodiments, execution of the primary action associated with the activated keyboard key may also be suppressed. This may be done in any suitable way; in one example, notification of the activation of the keyboard key may be "consumed" by the software layer providing execution of the secondary action, and may not be allowed to reach the software layer that would normally execute the keyboard key's primary action. For instance, in one example with reference to FIG. 3, a press of the spacebar while display text field 320 is determined to be targeted via the pointing device may be intercepted by AT software that may execute the secondary action of magnifying display text field 320, and the spacebar event may not be passed to the web browser event handlers that would otherwise cause a space to be inserted in input text field 330. By contrast, in some embodiments, when a keyboard key is activated while the onscreen object being pointed at is not determined to be targeted via the pointing device (e.g., in focus context), execution of the keyboard key's primary action may be allowed instead of any secondary action with respect to an onscreen object being pointed at.

In some embodiments, ease of use may be enhanced by providing an indication to the user when an onscreen object is determined to be targeted via the pointing device, thus alerting the user that activating a keyboard key may cause execution of a secondary action with respect to the onscreen object rather than the primary action of the keyboard key. Alternatively or additionally, in some embodiments an indication may be provided to the user when it is determined that no onscreen object is targeted via the pointing device, thus alerting the user that activating a keyboard key may cause execution of the keyboard key's primary action rather than a secondary action with respect to an onscreen object. These indications may be provided, for example, by indicating the current input mode (e.g., pointer mode or focus mode) to the user. Any suitable indicator or combination of indicators, including one or more visual indicators, audio indicators and/or tactile indicators may be used, as aspects of the invention are not limited in this respect.

In some exemplary embodiments, visual indicators that an onscreen object is determined to be targeted via the pointing device (e.g., pointer mode) may include emphasizing the pointing image and/or the onscreen object determined to be targeted, and/or may include de-emphasizing the insertion point and/or the onscreen object having keyboard focus. Correspondingly, in some embodiments, visual indicators that no onscreen object is determined to be targeted via the pointing device (e.g., focus mode) may include emphasizing the insertion point and/or the onscreen object having keyboard focus, and/or may include de-emphasizing the pointing image and/or the onscreen object currently being pointed at. For example, emphasizing the pointing image and/or the insertion point may include increasing its contrast, while de-emphasizing the pointing image and/or the insertion point may include dimming, increasing its transparency, or completely removing it from the display. Similarly, emphasizing and/or de-emphasizing an onscreen object may include applying different levels of highlighting, shading, transparency, background color, etc. In some embodiments, the degree of emphasis and/or de-emphasis may vary with the confidence level in the determination that an onscreen object is or is not targeted via the pointing device. For instance, in one example, if the current input mode is focus mode with 70% confidence level, then the insertion point and/or one or more aspects of the onscreen object with keyboard focus may be rendered with 70% opacity, while the pointing image and/or one or more aspects of the onscreen object currently pointed at may be rendered with 30% opacity.

Any suitable technique(s) may be utilized for computing a confidence level in a determination of whether an onscreen object is targeted via the pointing device, as aspects of the invention are not limited in this respect. In one example methodology, the confidence level in the current input mode may be initialized to any suitable initial level (e.g., 50%, 100%, etc.) when the input mode is set (e.g., upon a switch to that input mode). The confidence level may then be adjusted as user input is monitored for consistency with the current input mode. Some non-limiting examples of user input that may affect a current confidence level in the current input mode are provided below:

| Current Input Mode | User Input Received | Resulting Change in Confidence Level |
| --- | --- | --- |
| Focus Mode | Activation of keyboard key having primary action applicable to current keyboard focus. | Small increase |
| | Activation of keyboard key having no designated secondary action with respect to onscreen object currently pointed at. | Large increase |
| | Activation of keyboard key having a designated secondary action with respect to onscreen object currently pointed at, and no primary action applicable to current keyboard focus. | Large decrease |
| | Non-targeting movement via pointing device. | Small decrease |
| | Targeting movement via pointing device. | Large decrease |
| Pointer Mode | Activation of keyboard key having a designated secondary action with respect to onscreen object currently pointed at. | Small increase |
| | Activation of keyboard key having no primary action applicable to current keyboard focus. | Large increase |
| | Activation of keyboard key having primary action applicable to current keyboard focus, and no designated secondary action with respect to onscreen object currently pointed at. | Large decrease |
| | Non-targeting movement via pointing device. | Small increase |
| | Targeting movement via pointing device. | Large increase |

In some embodiments, when the confidence level in the current input mode decreases below any suitable specified threshold (e.g., 0%, 25%, 50%, etc.), the input mode may be switched in response. It should be appreciated, however, that the foregoing examples with respect to confidence level determination are provided merely for illustration. Aspects of the invention are not limited to any particular technique(s) for determining and/or adjusting a confidence level, and some embodiments may not employ any confidence level determinations.

Figure 4:
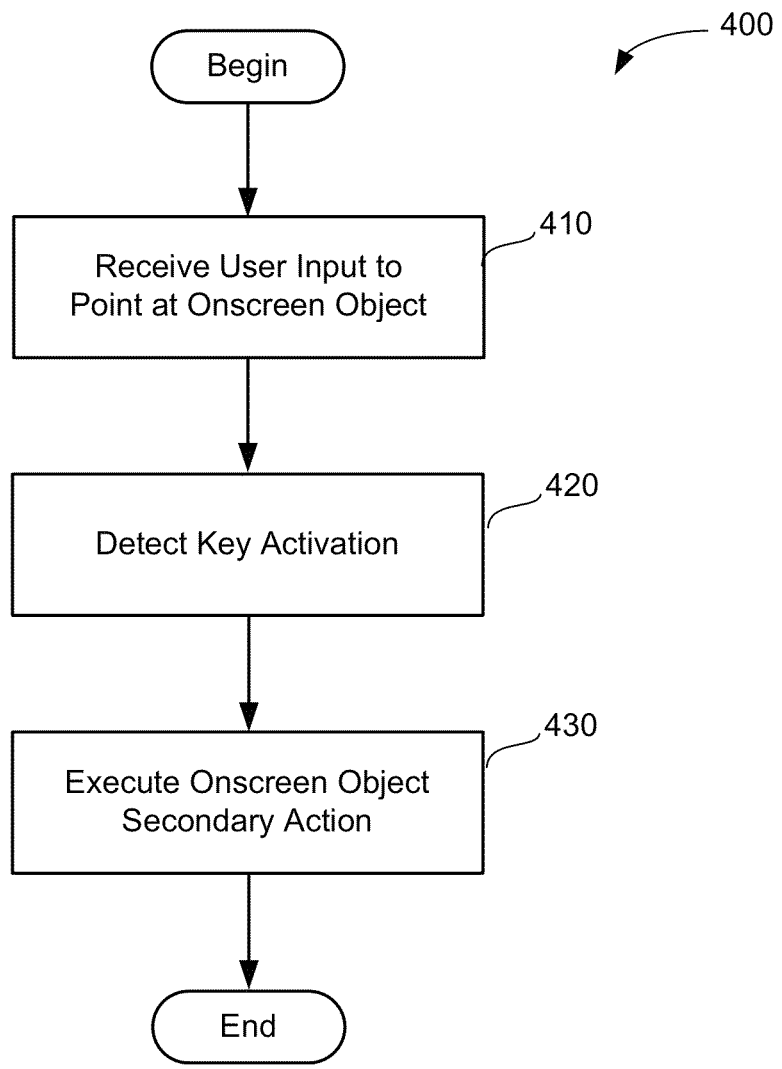
FIG. 4 is a flowchart illustrating an exemplary method in accordance with some embodiments of the present invention.

It should be appreciated from the foregoing that one embodiment of the invention is directed to a method 400 for executing a secondary action with respect to an onscreen object, as illustrated in FIG. 4. Method 400 may be performed, for example, by one or more components of a computer system 100, although other implementations are possible, as method 400 is not limited in this respect. Method 400 begins at act 410, at which user input may be received, via a pointing device, to point a pointing image at an onscreen object. At act 420, while the pointing image is pointing at the onscreen object, activation of a keyboard key may be detected. Method 400 ends at act 430, at which, in response to the user activating the keyboard key while the pointing image is pointing at the onscreen object, a secondary action may be executed with respect to the onscreen object.

Figure 5:
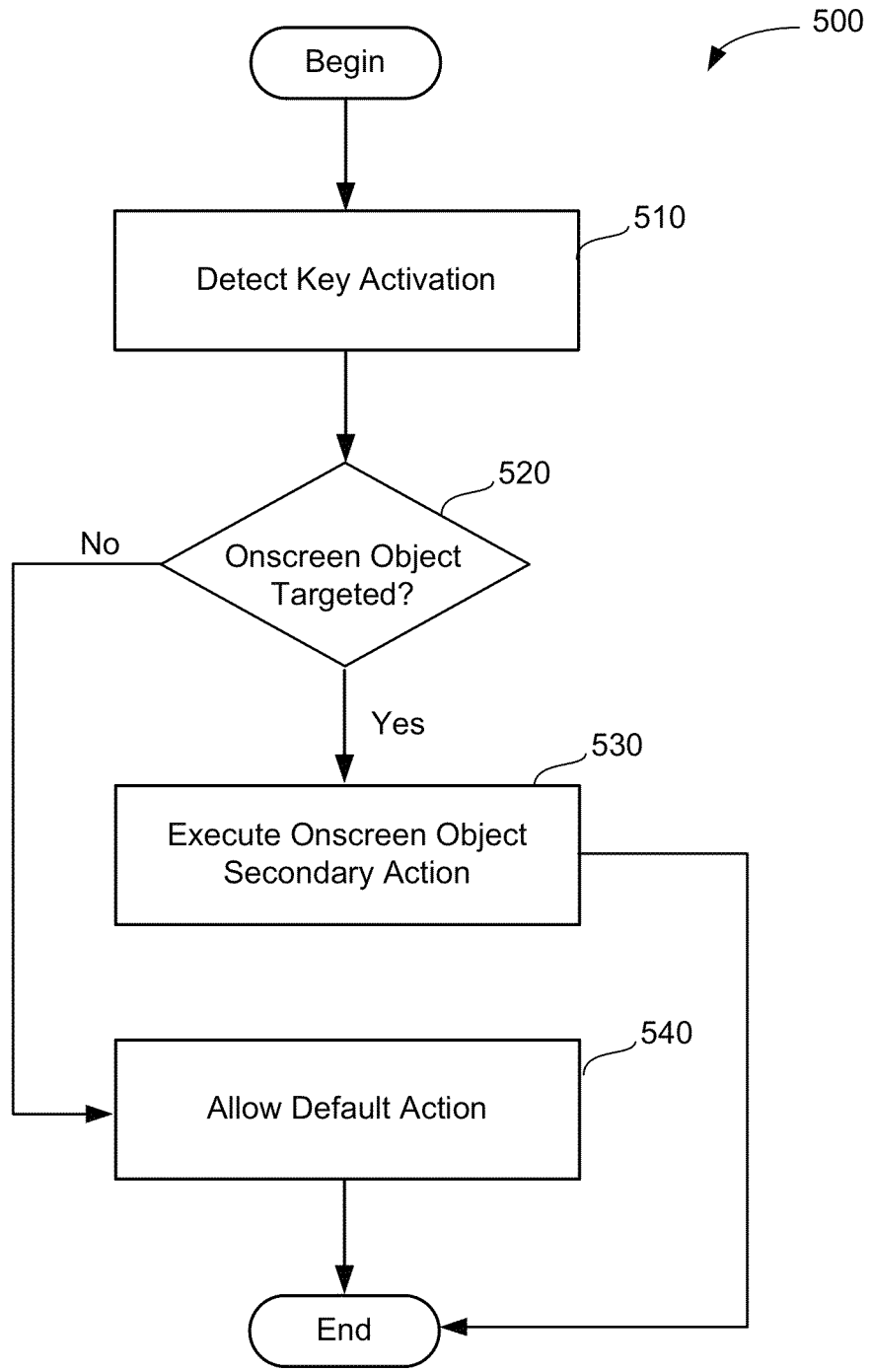
FIG. 5 is a flowchart illustrating another exemplary method in accordance with some embodiments of the present invention.

It should be further appreciated from the foregoing that another embodiment of the invention is directed to a method 500 for processing activation of a keyboard key, as illustrated in FIG. 5. Method 500 may be performed, for example, by one or more components of a computer system 100, although other implementations are possible, as method 500 is not limited in this respect. Method 500 begins at act 510, at which activation of a keyboard key may be detected. At act 520, the manner in which to process the key activation may be determined based on whether an onscreen object is targeted via the pointing device when activation of the keyboard key is detected. Exemplary techniques for determining whether an onscreen object is targeted via the pointing device are described above. In some embodiments, a determination of whether an onscreen object is targeted via the pointing device may be made upon detection of the key activation. Alternatively or additionally, in some embodiments, a determination of whether an onscreen object is targeted via the pointing device may be made before the key activation is detected, and act 520 may comprise consulting the most recent determination when the key activation is detected.

If it is determined that an onscreen object is targeted via the pointing device, then at act 530 a secondary action with respect to the onscreen object may be executed, in response to the detected key activation. If it is determined that the onscreen object is not targeted via the pointing device, then at act 540 a different default action may be allowed in response to the detected key activation. As discussed above, in some embodiments the default action may be execution of a primary action associated with the keyboard key.

Figure 6:
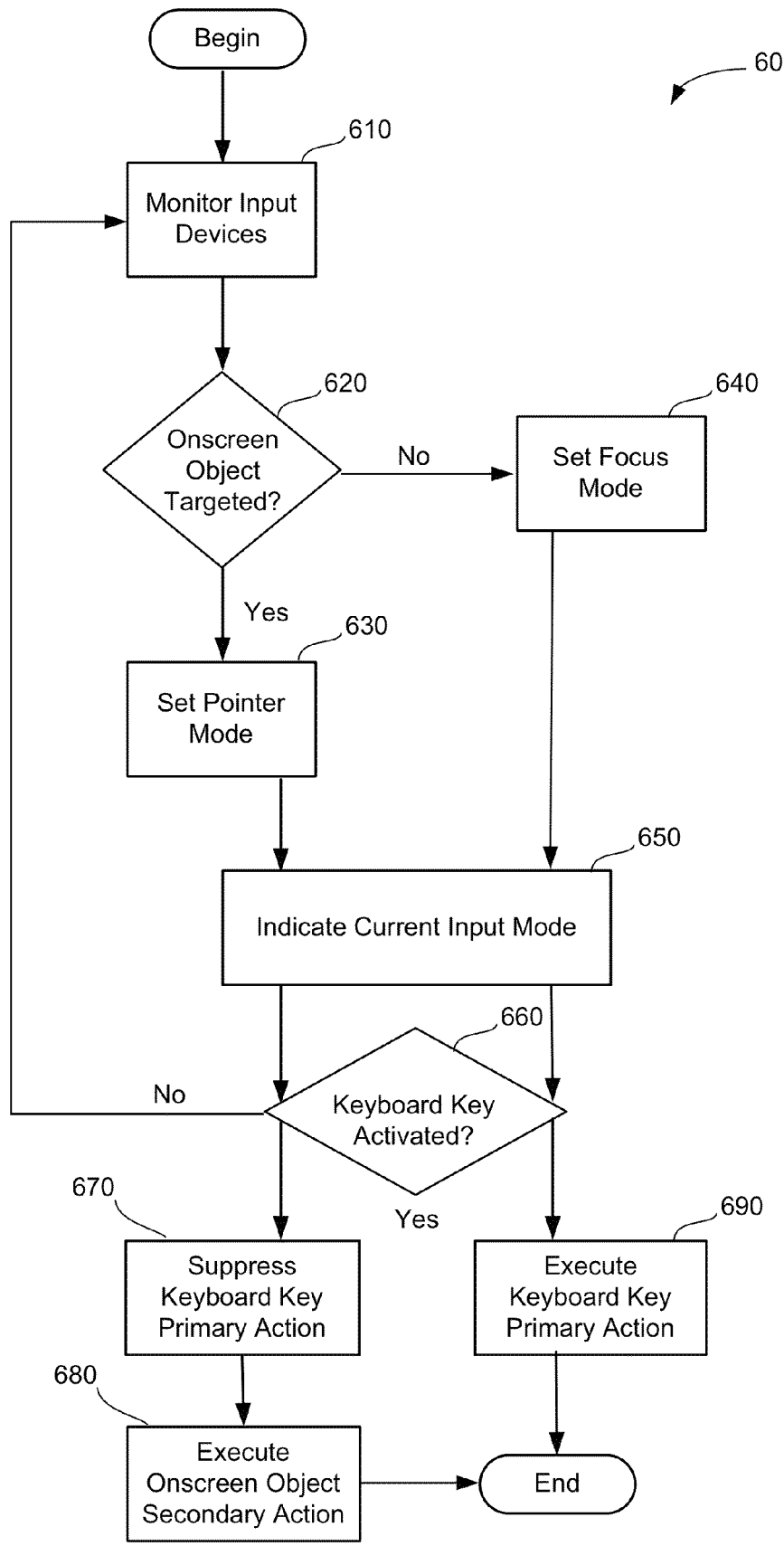
FIG. 6 is a flowchart illustrating another exemplary method in accordance with some embodiments of the present invention.

It should be further appreciated from the foregoing that another embodiment of the invention is directed to a method 600 for processing user input, as illustrated in FIG. 6. Method 600 may be performed, for example, by one or more components of a computer system 100, although other implementations are possible, as method 600 is not limited in this respect. Method 600 begins at act 610, at which one or more input devices may be monitored. As discussed above, in some embodiments, the input devices may include at least a pointing device. At act 620, a determination may be made, based on user input received via the monitored input device(s), as to whether an onscreen object is targeted via the pointing device. Exemplary techniques for determining whether an onscreen object is targeted via the pointing device are described above. If it is determined that an onscreen object is targeted via the pointing device, then the current input mode may be set to pointer mode at act 630. If it is not determined that an onscreen object is targeted via the pointing device, then the current input mode may be set to focus mode at act 640. At act 650, the current input mode (pointer mode or focus mode) may be indicated to the user. Exemplary techniques for indicating the current input mode to the user are described above.

At act 660, method 600 may loop back to act 610 to continue to monitor the input devices and update the determination of whether an onscreen object is currently targeted via the pointing device, until a keyboard key is activated. When a keyboard key is activated at act 660, method 600 may follow one of two paths depending on the current input mode. In pointer mode, method 600 may proceed to act 670, at which any primary action of the keyboard key may be suppressed. Exemplary techniques for suppressing the primary action of a keyboard key are described above. At act 680, a secondary action may be executed with respect to the targeted onscreen object, in response to the activation of the keyboard key. In focus mode, method 600 may proceed from act 660 to act 690, at which a primary action, if any, of the keyboard key may be allowed to execute.

Figure 7:
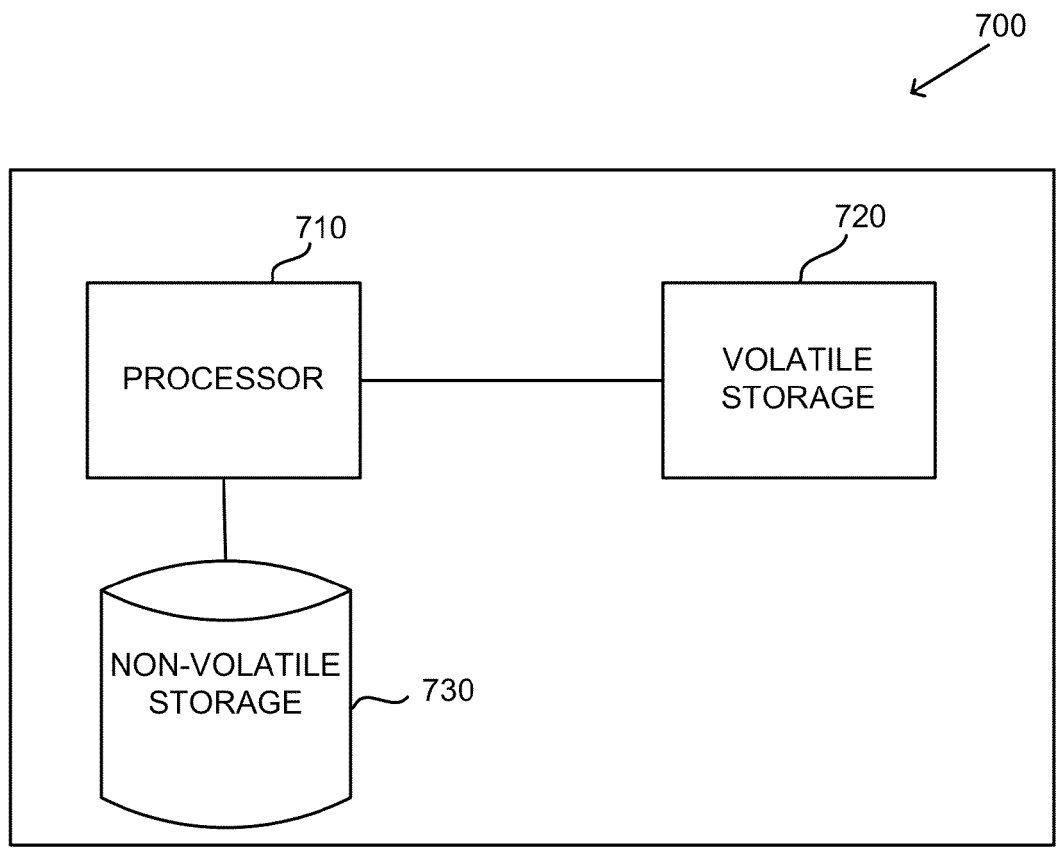
FIG. 7 is a block diagram illustrating an exemplary computer system on which aspects of the present invention may be implemented.

A computer system in accordance with the techniques described herein may take any suitable form, as aspects of the present invention are not limited in this respect. An illustrative implementation of a computer system 700 that may be used in connection with some embodiments of the present invention is shown in FIG. 7. One or more computer systems such as computer system 700 may be used to implement any of the functionality described above. The computer system 700 may include one or more processors 710 and one or more computer-readable storage media (i.e., tangible, non-transitory computer-readable media), e.g., volatile storage 720 and one or more non-volatile storage media 730, which may be formed of any suitable non-volatile data storage media. The processor 710 may control writing data to and reading data from the volatile storage 720 and/or the non-volatile storage device 730 in any suitable manner, as aspects of the present invention are not limited in this respect. To perform any of the functionality described herein, processor 710 may execute one or more instructions stored in one or more computer-readable storage media (e.g., volatile storage 720 and/or non-volatile storage 730), which may serve as tangible, non-transitory computer-readable media storing instructions for execution by the processor 710.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

In this respect, it should be appreciated that one implementation of embodiments of the present invention comprises at least one computer-readable storage medium (i.e., at least one tangible, non-transitory computer-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded onto any computer resource to implement aspects of the present invention discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present invention.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system receiving input from a user via at least a keyboard and a pointing device, wherein input via the pointing device causes corresponding movement of a pointing image on a display screen of the computer system, a method comprising:
   receiving user input via the pointing device to point the pointing image at a first onscreen object on the display screen;
   analyzing at least a current keyboard input focus on a second onscreen object to determine whether (a) the first onscreen object is targeted via the pointing device despite the second onscreen object having current keyboard input focus, or (b) the pointing image is pointing at the first onscreen object but the first onscreen object is not targeted via the pointing device, wherein the analyzing comprises, in response to determining that the second onscreen object having current keyboard input focus is an HTML document, determining that the first onscreen object is targeted via the pointing device despite the HTML document having current keyboard input focus; and
   in response to the user activating a key on the keyboard while the first onscreen object is determined to be targeted via the pointing device and the pointing image is pointing at the first onscreen object, executing a secondary action with respect to the first onscreen object, and suppressing execution of an action of the keyboard key with respect to the second onscreen object having the current keyboard input focus.

2. The method of claim 1, wherein the keyboard key is a text input key.

3. The method of claim 2, wherein the keyboard key is a letter key, a number key, a punctuation key, a symbol key, a spacebar, or a navigation key.

4. The method of claim 3, wherein the keyboard key is a spacebar, and wherein executing the secondary action comprises magnifying the first onscreen object on the display screen.

5. The method of claim 1, further comprising, in response to the user activating a different key on the keyboard while the first onscreen object is determined to be targeted via the pointing device and the pointing image is pointing at the first onscreen object, executing a different secondary action with respect to the first onscreen object.

6. The method of claim 1, further comprising analyzing the user input received via the pointing device in determining whether the first onscreen object is targeted via the pointing device.

7. The method of claim 1, further comprising, in response to the user activating the keyboard key while the pointing image is pointing at the first onscreen object but the first onscreen object is not determined to be targeted via the pointing device, allowing execution of a primary action of the keyboard key that is not a secondary action with respect to the first onscreen object.

8. The method of claim 1, further comprising providing to the user, prior to the user activating the keyboard key, an indication of whether an onscreen object is determined to be targeted via the pointing device.

9. The method of claim 1, wherein suppressing execution of the action of the keyboard key comprises suppressing execution of a primary action of the keyboard key.

10. At least one computer-readable storage medium storing computer-executable instructions that, when executed, perform a method in a computer system receiving input from a user via at least a keyboard and a pointing device, wherein input via the pointing device causes corresponding movement of a pointing image on a display screen of the computer system, the method comprising:
receiving user input via the pointing device to point the pointing image at a first onscreen object on the display screen;
analyzing at least a current keyboard input focus on a second onscreen object to determine whether (a) the first onscreen object is targeted via the pointing device despite the second onscreen object having current keyboard input focus, or (b) the pointing image is pointing at the first onscreen object but the first onscreen object is not targeted via the pointing device, wherein the analyzing comprises, in response to determining that the second onscreen object having current keyboard input focus is an HTML document, determining that the first onscreen object is targeted via the pointing device despite the HTML document having current keyboard input focus; and
in response to the user activating a key on the keyboard while the first onscreen object is determined to be targeted via the pointing device and the pointing image is pointing at the first onscreen object, executing a secondary action with respect to the first onscreen object, and suppressing execution of an action of the keyboard key with respect to the second onscreen object having the current keyboard input focus.

11. The at least one computer-readable storage medium of claim 10, wherein the keyboard key is a text input key.

12. The at least one computer-readable storage medium of claim 11, wherein the keyboard key is a letter key, a number key, a punctuation key, a symbol key, a spacebar, or a navigation key.

13. The at least one computer-readable storage medium of claim 12, wherein the keyboard key is a spacebar, and wherein executing the secondary action comprises magnifying the first onscreen object on the display screen.

14. The at least one computer-readable storage medium of claim 10, wherein the method further comprises, in response to the user activating a different key on the keyboard while the first onscreen object is determined to be targeted via the pointing device and the pointing image is pointing at the first onscreen object, executing a different secondary action with respect to the first onscreen object.

15. The at least one computer-readable storage medium of claim 10, wherein the method further comprises analyzing the user input received via the pointing device in determining whether the first onscreen object is targeted via the pointing device.

16. The at least one computer-readable storage medium of claim 10, wherein the method further comprises, in response to the user activating the keyboard key while the pointing image is pointing at the first onscreen object but the first onscreen object is not determined to be targeted via the pointing device, allowing execution of a primary action of the keyboard key that is not a secondary action with respect to the first onscreen object.

17. The at least one computer-readable storage medium of claim 10, wherein the method further comprises providing to the user, prior to the user activating the keyboard key, an indication of whether an onscreen object is determined to be targeted via the pointing device.

18. The at least one computer-readable storage medium of claim 10, wherein suppressing execution of the action of the keyboard key comprises suppressing execution of a primary action of the keyboard key.

19. A computer system comprising:
a display screen configured to provide output from the computer system to a user;
a keyboard configured to accept input from the user to the computer system;
a pointing device configured to accept input from the user to the computer system, wherein input via the pointing device causes corresponding movement of a pointing image on the display screen;
at least one processor; and
at least one storage medium storing processor-executable instructions that, when executed by the at least one processor, perform a method comprising:
receiving user input via the pointing device to point the pointing image at a first onscreen object on the display screen;
analyzing at least a current keyboard input focus on a second onscreen object to determine whether (a) the first onscreen object is targeted via the pointing device despite the second onscreen object having current keyboard input focus, or (b) the pointing image is pointing at the first onscreen object but the first onscreen object is not targeted via the pointing device, wherein the analyzing comprises, in response to determining that the second onscreen object having current keyboard input focus is an HTML document, determining that the first onscreen object is targeted via the pointing device despite the HTML document having current keyboard input focus; and
in response to the user activating a key on the keyboard while the first onscreen object is determined to be targeted via the pointing device and the pointing image is pointing at the first onscreen object, executing a secondary action with respect to the first onscreen object, and suppressing execution of an action of the keyboard key with respect to the second onscreen object having the current keyboard input focus.

20. The computer system of claim 19, wherein the keyboard key is a text input key.

21. The computer system of claim 20, wherein the keyboard key is a letter key, a number key, a punctuation key, a symbol key, a spacebar, or a navigation key.

22. The computer system of claim 21, wherein the keyboard key is a spacebar, and wherein executing the secondary action comprises magnifying the first onscreen object on the display screen.

23. The computer system of claim 19, wherein the method further comprises, in response to the user activating a different key on the keyboard while the first onscreen object is determined to be targeted via the pointing device and the pointing image is pointing at the first onscreen object, executing a different secondary action with respect to the first onscreen object.

24. The computer system of claim 19, wherein the method further comprises analyzing the user input received via the pointing device to determine whether the first onscreen object is targeted via the pointing device.

25. The computer system of claim 19, wherein the method further comprises, in response to the user activating the keyboard key while the pointing image is pointing at the first onscreen object but the first onscreen object is not determined to be targeted via the pointing device, allowing execution of a primary action of the keyboard key that is not a secondary action with respect to the first onscreen object.

26. The computer system of claim 19, wherein the method further comprises providing to the user, prior to the user activating the keyboard key, an indication of whether an onscreen object is determined to be targeted via the pointing device.

27. The computer system of claim 19, wherein suppressing execution of the action of the keyboard key comprises suppressing execution of a primary action of the keyboard key.

* * * * *